US009740428B1

(12) United States Patent
Sorensen et al.

(10) Patent No.: US 9,740,428 B1
(45) Date of Patent: Aug. 22, 2017

(54) CIRCULAR BUFFER DESCRIPTOR FOR DESCRIBING AND/OR ACCESSING A CIRCULAR BUFFER

(71) Applicant: Cirrus Logic International Semiconductor Ltd., Edinburgh (GB)

(72) Inventors: Bryant E. Sorensen, Austin, TX (US); Anthony James Magrath, Edinburgh (GB); Jeffrey D. Alderson, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 0 days.

(21) Appl. No.: 15/147,672

(22) Filed: May 5, 2016

(51) Int. Cl.
*G06F 12/02* (2006.01)
*G06F 3/06* (2006.01)

(52) U.S. Cl.
CPC .......... *G06F 3/0656* (2013.01); *G06F 3/0611* (2013.01); *G06F 3/0673* (2013.01)

(58) Field of Classification Search
CPC ..... G06F 3/0656; G06F 3/0611; G06F 3/0673
USPC ......................................................... 711/154
See application file for complete search history.

(56) References Cited

U.S. PATENT DOCUMENTS

| 5,829,054 | A * | 10/1998 | Ehlig ............. | G01R 31/318536 710/22 |
|---|---|---|---|---|
| 9,294,230 | B2 * | 3/2016 | Han ...................... | H04L 1/1657 |
| 9,564,927 | B2 * | 2/2017 | Fonseka ............ | H03M 13/2906 |
| 2011/0047346 | A1 | 2/2011 | Cypher et al. | |

OTHER PUBLICATIONS

Sohie et al.: "A digital signal processor with IEEE floating-point arithmetic", IEEE Micro, IEEE Service Center, vol. 8, No. 6, Dec. 1, 1988, pp. 49-67, Los Alamitos, CA, US.
Willems et al.: "Modulo-Addressing Utilization in Automatic Software Synthesis for Digital Signal Processors", 1997 IEEE International Conference on Acoustics, Speech, and Signal Processing, Speech Processing. Munich, Apr. 21-24, 1997; Jan. 1, 1997, pp. 687-690, Los Alamitos, IEEE Comp. Soc. Press.
ANC DSP 2.2 Internal Storage Registers, Cirrus Logic, Feb. 1, 2014.

* cited by examiner

*Primary Examiner* — Pierre-Michel Bataille
(74) *Attorney, Agent, or Firm* — Norton Rose Fulbright US LLP (57) ABSTRACT

Accessing a circular buffer in memory from a processor may be performed with the aid of precomputed values stored in a pointer descriptor field of a processor storage element, such as a register. The pointer descriptor may store a precomputed value for calculating a memory address in the circular buffer, which may include two values, in which the two values are based, at least in part, on the size of the circular buffer, but neither be the size of the circular buffer. The first value may be used to derive a starting memory location for a circular buffer. The second value may be used in combination with the first value to calculate an end memory location. The start and end locations or addresses, along with the precomputed stored values, are then used to calculate the next address based on the current address of a circular buffer in an efficient manner.

31 Claims, 5 Drawing Sheets

CIRCULAR BUFFER DESCRIPTOR FOR DESCRIBING AND/OR ACCESSING A CIRCULAR BUFFER

FIELD OF THE DISCLOSURE

The instant disclosure relates to processors. More specifically, portions of this disclosure relate to improving access to memory from the processor.

BACKGROUND

Figure 1:
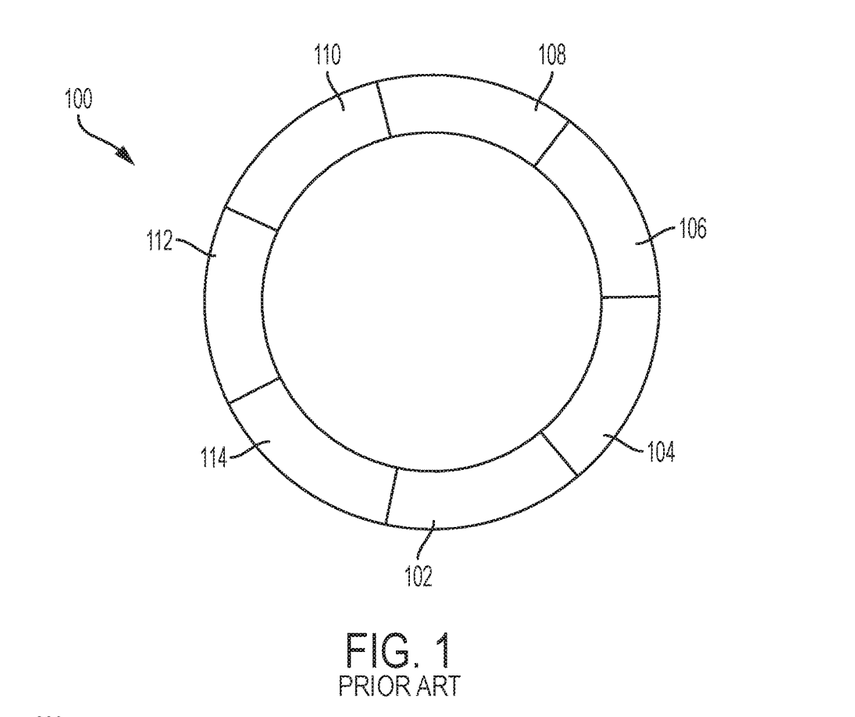
FIG. 1 is a drawing conceptually showing a circular buffer according to the prior art.

Circular buffers are one data structure for storing information in computer systems. Conceptually a circular buffer is shown in FIG. 1. FIG. 1 is a drawing conceptually showing a circular buffer according to the prior art. A circular buffer 100 includes memory elements 102, 104, 106, 108, 110, 112, and 114 organized in a circular fashion. When writing data to the circular buffer 100, a processor may write information first to memory element 102, then element 104, then element 106, then element 108, then element 110, then element 112, then element 114, and then continue around the circle again as more data is written into the buffer 100. In this sense, the circular buffer provides an endless buffer, in that new data can continue to be written into the buffer 100 regardless of whether there are any available memory elements. If a memory element has not yet been accessed to retrieve information stored in the memory element, then the old data of that memory element is written over with new data. Circular buffers may be well suited for implementing first-in-first-out (FIFO) buffers, in which the oldest data in a buffer should be the next data read out of the buffer. A conventional implementation of a circular buffer is a buffer in a keyboard for recording keystrokes. Another conventional implementation of a circular buffer is for performing filtering operations on data.

Figure 2:
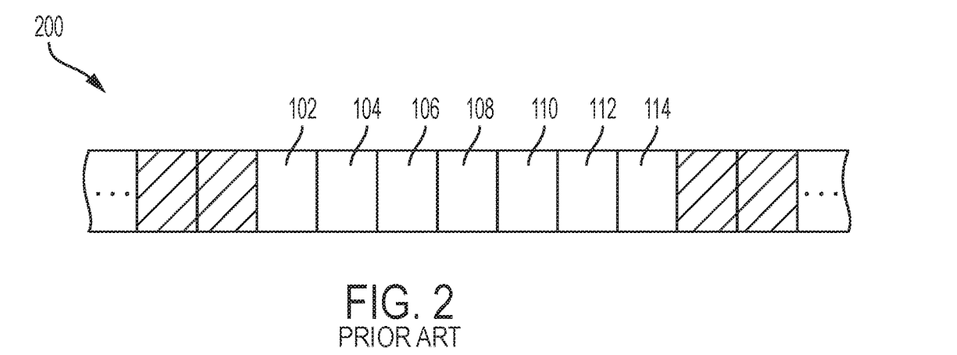
FIG. 2 is a drawing showing a circular buffer implemented in linear memory according to the prior art.

Although conceptually the circular buffer is circular in operation, computer memory devices are linearly-accessed devices. Computer memory is addressed in a linear manner with addresses starting at zero and increasing up to the memory size. An implementation of a circular buffer in linear memory is shown in FIG. 2. FIG. 2 is a drawing showing a circular buffer implemented in linear memory according to the prior art. A linear memory 200 includes the memory elements 102, 104, 106, 108, 110, 112, and 114. Conceptually, a processor can move from element 102 to 104 through a simple step, and likewise for each of the other steps through the circular buffer 100, including from element 114 back to 102. However, as shown in the circular buffer 200 of FIG. 2, the step from memory element 114 to memory element 102 is not a simple step but a jump through the linear memory 200. As operations progress through the circular buffer 200, calculating the current and next address can be difficult. For example, moving from memory element 106 to 108 may be as simple as adding a fixed amount to the memory address for memory element 106. However, moving from memory element 114 to 102 require more complicated math that can slow down access to the circular buffer 200 and increase difficulty for a programmer writing an application using the circular buffer 200 to store data.

Shortcomings mentioned here are only representative and are included simply to highlight that a need exists for improved electrical components, particularly for processors employed in consumer-level devices, such as mobile phones. Embodiments described herein address certain shortcomings but not necessarily each and every one described here or known in the art.

SUMMARY

In certain embodiments, accessing a circular buffer from a processor may be performed with the aid of precomputed values stored in a processor storage element accessible to the processor. The precomputed values may prevent or reduce repeated calculations involved in calculating memory addresses for elements in the circular buffer. By reducing the repeated calculations, the circular buffer may be accessed more efficiently by reducing a number of processing cycles required to compute an address and access the element corresponding to the calculated address. Further, by reducing the number of computations, the processor may have lower power consumption. In applications employing frequent access to a circular buffer, such as multimedia applications, the power savings may be particularly advantageous. Further, in processors for mobile devices, the reduced power consumption may be particularly advantageous due to the limited power capacity of the mobile device's battery.

In one embodiment, a circular buffer descriptor, such as a pointer descriptor (PD), may be stored in a processor memory storage element, such as a register in the processor. The pointer descriptor may store one or more precomputed values for calculating a memory address in the circular buffer. In certain embodiments, the pointer descriptor may include two values, in which the two values are based, at least in part, on the size of the circular buffer, but neither of the two values is the size of the circular buffer.

A circular buffer may be described by a start location in memory and an accompanying end location in memory, in which the pair of start and end location in memory describes a memory range. The intent of addressing within a circular buffer is to compute addresses that remain within the memory range of the circular buffer, given a current address that resides within the memory range and an offset to the current address. There may be multiple start locations in memory that are all valid for a circular buffer given the size of the circular buffer. In some embodiments, the multiple start locations may all be mathematically related. The collection of these valid start locations and the corresponding end locations may be referred to as a set of valid location pairs, or a set of valid memory ranges. The first value of the pointer descriptor may be used to derive a starting memory location for a circular buffer. The second value of the pointer descriptor may be used in combination with the first value to calculate an end memory location. A combination of the first value and the second value may thus describe a collection or a set of valid start and end locations for the circular buffer.

According to one embodiment, a method for describing a circular buffer includes calculating two values based, at least in part, on the size of the circular buffer but that are not equal to the size of the circular buffer, and wherein the two values define a valid set of memory locations for the circular buffer wherein the valid set comprises a multiple number of valid memory ranges and wherein the valid memory ranges have starting memory locations and end memory locations. The method may also, in some embodiments, include concatenating the two values into contiguous bits and/or storing the concatenated values in a processor storage element.

In certain embodiments, the step of calculating the two values may include calculating a first value of the two values that is used to derive the starting memory locations respectively for the valid memory ranges; the step of calculating the first value may include calculating a value equal to ceiling(log 2(size)), wherein ceiling( ) is a function that returns the next integer value greater than or equal to an input value (in this case the binary logarithm of the size of the circular buffer); the step of calculating the two values may include calculating a second value of the two values that is used in conjunction with the first value to calculate the end memory locations respectively for the valid memory ranges; the step of storing the concatenated values in a processor storage element may include storing the concatenated values in a single register; the step of calculating two values may include calculating the two values in one processor cycle using a single instruction with a single input to the instruction, wherein the single input consists of the size of the circular buffer; the step of calculating two values may include calculating the two values from known constant values at compile time of processor software; and/or the step of calculating two values may include storing the constant value in an executable memory image from the compiler of the processor.

In certain embodiments, the method may also include recalling the two values from the single register when performing modulo arithmetic to compute a next memory address when accessing data stored in the circular buffer and/or using the two values to derive a start memory location and an end memory location for each of the valid memory ranges.

According to another embodiment, an apparatus may include a processor and a processor storage element coupled to the processor. The processor may be configured to perform the step of calculating two values based, at least in part, on the size of the circular buffer but that are not equal to the size of the circular buffer, and wherein the two values define a valid set of memory locations for the circular buffer wherein the valid set comprises a multiple number of valid memory ranges and wherein the valid memory ranges have starting memory locations and end memory locations. The processor may also be configured to perform steps of concatenating the two values into contiguous bits and/or storing the concatenated values in the processor storage element. In certain embodiments, the processor storage element may include a single register.

In some embodiments, the processor may perform the step of calculating the two values by calculating a first value of the two values that is used to derive the starting memory locations respectively for the valid memory ranges; may perform the step of calculating the first value by calculating a value equal to ceiling(log 2(size)); may perform the step of calculating the two values by calculating a second value of the two values that is used in conjunction with the first value to calculate the end memory locations respectively for the valid memory ranges; the processor may perform the step of recalling the two values from the single register when performing modulo arithmetic to compute a next memory address when accessing data stored in the circular buffer; and/or the processor may perform the step of using the two values to derive a start memory location and an end memory location for each of the valid memory ranges.

According to another embodiment, a circular buffer descriptor may include a contiguous set of bits comprising two values, wherein the two values are based, at least in part, on a size of a circular buffer and are not equal to the size of the circular buffer, and wherein the two values define a valid set of memory locations for the circular buffer wherein the valid set comprises a multiple number of valid memory ranges and wherein the valid memory ranges have starting memory locations and end memory locations.

In certain embodiments, a first value of the two values is used to derive the starting memory locations for the valid memory ranges; a second value of the two values is used in conjunction with the first value to calculate the end memory locations for the valid memory ranges; and/or a first value and a second value of the two values are used in modulo arithmetic to compute a next memory address, in conjunction with the current address, when accessing data stored in the circular buffer and used to derive a start memory location and an end memory location for each of the valid memory range.

According to a further embodiment, a computer program product may include a non-transitory computer readable medium having code to perform steps including calculating two values based, at least in part, on the size of the circular buffer but that are not equal to the size of the circular buffer; and concatenating the two values into contiguous bits. The computer program product may include, for example, firmware code for a processor, assembly code for execution by a processor, and/or compiler code for generating executable code for a processor. The two calculated values may define a valid set of memory locations for the circular buffer, wherein the valid set comprises a multiple number of valid memory ranges, and wherein the valid memory ranges have starting memory locations and end memory locations, and wherein the step of calculating the two values comprises calculating a value equal to ceiling(log 2(size)).

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 3:
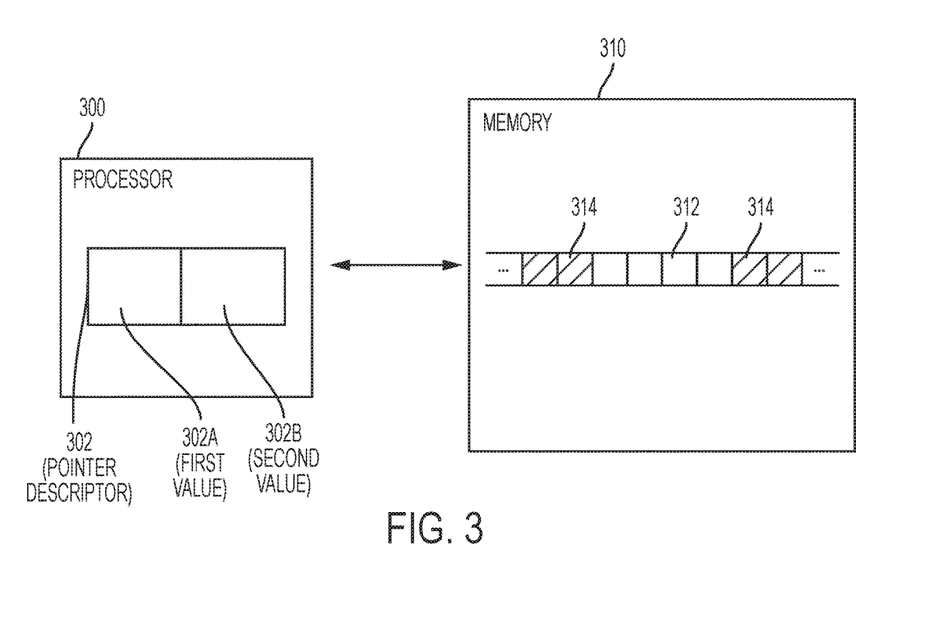
FIG. 3 is an example block diagram illustrating a processor with a pointer descriptor register for accessing a buffer in memory according to one embodiment of the disclosure.

FIG. 3 is an example block diagram illustrating a processor with a pointer descriptor register for accessing a buffer in memory according to one embodiment of the disclosure. A processor 300 may be coupled to a memory 310. The processor 300 may be, for example, a digital signal processor, a central processor unit, a graphics processor unit, or other logic device. The memory 310 may be, for example, random access memory (RAM), register files, flash memory, a hard disk drive (HDD), a solid state drive (SSD), or other device capable of storing data either temporarily or permanently, which physically uses linearly sequential addressing. The processor 300 may include memory or be coupled to memory that contains a description of the circular buffers available to the processor 300. Such a circular buffer descriptor may be stored, for example, in a processor storage element, such as a register, cache memory, local memory, hard disk drives, solid state drivers, and/or remote memory or drives. In one embodiment, the processor 300 may include a processor storage element, such as a register or memory location, that stores a circular buffer descriptor in pointer descriptor 302. The pointer descriptor 302 may include one or more values useful for calculating memory addresses for a circular buffer 312 stored in the memory 310. In some embodiments, the processor 300 may include multiple pointer descriptors 302 and access multiple circular buffers in the memory 300 or other memories, in which each pointer descriptor assists with accessing a different circular buffer. The circular buffer 312 may be stored in a linear fashion in the memory 310 as described above with reference to FIG. 2. Thus, the circular buffer 312 may be surrounded in memory by other data 314.

The circular buffer 312 may occupy either contiguous or non-contiguous elements in memory 310. In some embodiments, the circular buffer 312 may include a single contiguous block of memory in memory 310 as shown in FIG. 3. In these embodiments, the pointer descriptor 302 may include one or more values useful for defining the single start address of the circular buffer 314 and the single final address of the circular buffer. In some embodiments, the circular buffer 312 may include two or more non-contiguous blocks of memory in memory 310. In these embodiments, values stored in the pointer descriptor 302 may describe a collection or set of valid start and end addresses (e.g., a plurality of start and end addresses) for the circular buffer. Thus, the pointer descriptor 302 may contain values used to describe memory addresses for either contiguous memory elements or non-contiguous memory elements.

Figure 4:
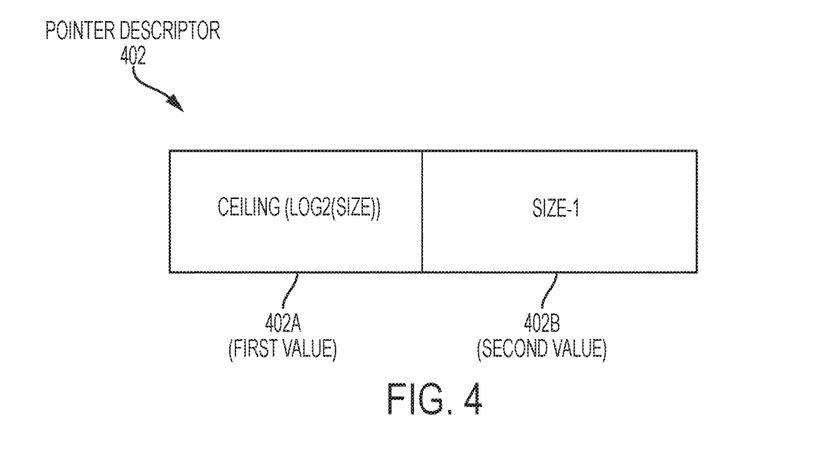
FIG. 4 is an example block diagram illustrating a pointer descriptor register with two values for determining addresses in a buffer according to one embodiment of the disclosure.

In one embodiment, the pointer descriptor 302 may include two values: a first value 302A and a second value 302B. A first value 302A of the two values may be used to derive the starting memory locations respectively for the valid memory ranges for the circular buffer 312 within memory 310. In certain embodiments, the first value 302A may be computed as a value equal to ceiling(log 2(size)). A second value 302B of the two values may be used in conjunction with the first value 302A to calculate the end memory locations respectively for the valid memory ranges of the circular buffer 312 within memory 310. In certain embodiments, the second value 302B may be computed as a value equal to (size-1), where size equals the size of the memory range. In some embodiments, the size of the values 302A and 302B may be 5 bits and 19 bits, respectively. FIG. 4 is an example block diagram illustrating a pointer descriptor register with two values for determining addresses in a buffer according to one embodiment of the disclosure. A pointer descriptor 402 may include a first value 402A equal to a rounded up version of the binary (base-2) logarithm of the size of the circular buffer 312 and may include a second value 402B equal to one less than the size of the circular buffer 312.

The pointer descriptor 402 may be generated by executing an instruction, such as a "MK_PD" or other instruction on the processor 300. This instruction may execute steps that calculate the second value (e.g., size-1) by recalling the size of the circular buffer and decrementing the recalled value by one. This instruction may also execute steps that calculate the first value by determining the position of the highest set bit of the size-1 value, and then adding one to the determined position to get the ceiling(log 2(size)) value. This instruction may then execute steps that concatenate the two values into contiguous bits for storage in a processor storage element. In some embodiments, the instruction for generating the pointer descriptor may be an assembly instruction that executes in one clock cycle, such as by dividing the steps into simple calculations. The computations may be based on a size of the circular buffer. One example code segment for performing these steps is listed below:

```
stPD size_to_PD(stSHORT size)
{
uint19_t a;
ut5 cnt = 0;
ut5 count = 0;
uint3_t any Valid;
uint3_t cnt0, cnt1, cnt2;
uint3_t mlCnt, llCnt;
uint3_t lowerCnt;
stPD ret;
    a = (uint19_t)(size - 1); // size- 1
// partition into 8-bit groups for optimal speed/gate-count
    cnt0 = priorityEncode8 (    a[7: 0], anyValid[0]);
    cnt1 = priorityEncode8 (    a[15: 8], anyValid[1]);
    cnt2 = priorityEncode8 ("00000"::a[18:16], anyValid[2]);
    ut1 ml = anyValid[2];
    ut1 ll = anyValid[1] | anyValid[0];
    ut1 valid = ml | ll;
// select most significant group using valid bits; choose
between pairs
    mlCnt = cnt2;
    llCnt = anyValid[1] ? cnt1 : cnt0;
// Choose quadrant
    lowerCnt = ml ? mlCnt : llCnt;
// Form the count
    if (valid)
    {
       cnt[2:0] = lowerCnt;
       cnt[4] = ml;
       cnt[3]= ml ? 0: anyValid[1];
       count = cnt + 1;
    }
    ret = count::a;
    return ret;
}
uint3_t priorityEncode8 (uint8_t in, ut1& anyValid)
{
uint3_t out = 0;
       if (in[7]) out = 7;
    else if (in[6]) out = 6;
    else if (in[5]) out = 5;
    else if (in[4]) out = 4;
```

```
    else if (in[3]) out = 3;
    else if (in[2]) out = 2;
    else if (in[1]) out = 1;
    else      out = 0;
    anyValid = (in != 0);
    return out;
}
```

Referring back to FIG. 3, two or more values of the pointer descriptor 302, such as the first value 302A and the second value 302B, may be stored in contiguous bits in a processor storage element. In one embodiment, the bits representing the first value 302A may be concatenated with the bits representing the second value 302B. This concatenated set of bits representing the first and second values 302A and 302B may be stored in a processor storage element, such as a single register of a register file, or memory location, of the processor 300.

When processor 300 executes an application that stores or retrieves data in the circular buffer 312, the processor 300 may access the pointer descriptor 302 within the processor storage element and use values stored in the pointer descriptor 302 to enable accessing the circular buffer 312. For example, the values may be precomputed values that are used by the processor 300 in speeding calculation of memory addresses within the circular buffer 312, which may also reduce power consumption of the processor 300. In one embodiment, one or more values within the pointer descriptor 302 may be used in calculating a next address when accessing of the circular buffer 312. When a processor 300 accesses data within the circular buffer 312, the processor accesses one memory element of the circular buffer 312 and then proceeds to the next memory element of the circular buffer 312. The processor 300 may determine a next address for accessing the next element of the circular buffer 312 by performing arithmetic involving a current address for the currently-accessed element of the circular buffer 312 and the values in the pointer descriptor 302. In some embodiments, the arithmetic for calculating the next address may include modulo arithmetic, e.g., calculations including the modulo operator. For example, a next address may be calculated as:

next_address=(current_address+step) % size+start_address, where step may be a size of, or number of, elements within memory 310. When using the pointer descriptor 302 to assist in the generation of the next address field, the starting memory address and ending memory address may be calculated as:

start_address=(0xFFFFFF<<ceiling(log 2(size))) & current_address end_address=start_address|(size−1), where the (size−1) and (ceiling(log 2(size))) values may be retrieved from the pointer descriptor 302 stored in the processor storage element, rather than computed for each calculation. When the processor 300 is accessing the circular buffer 312, the processor 300 may recall the two values from the single register when performing modulo arithmetic to compute a next memory address when accessing data stored in the circular buffer 312. Then, the processor 300 may use the two values to compute a start memory location and an end memory location for at least one of the valid memory ranges, and in some embodiments, each of the valid memory ranges of the circular buffer 312. Next, the next memory address for an element in the circular buffer 312 may be computed based, at least in part on the current memory address, the start memory location, and the end memory location.

Figure 5:
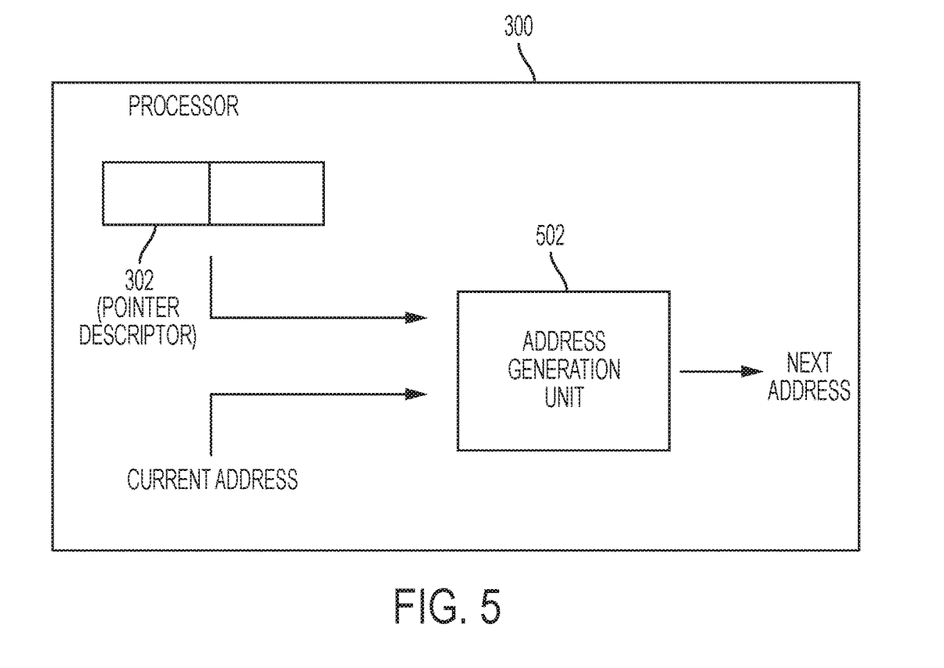
FIG. 5 is an example block diagram illustrating address generation in a processor using the pointer descriptor register according to one embodiment of the disclosure.

Circuitry for calculating a next memory address may be included in the processor 300 as shown in FIG. 5. FIG. 5 is an example block diagram illustrating address generation in a processor using the pointer descriptor register according to one embodiment of the disclosure. The processor 300 may include an address generation unit (AGU) 502. The AGU 502 may receive information from the processor storage element, including the pointer descriptor 302. The AGU 502 may also receive a current address for an element in the circular buffer 312. The current address may be stored, for example, in another processor storage element separate from the pointer descriptor 302. The AGU 502 may generate a next address value, and that next address value may be used to access the memory 310 by outputting the next address value to an address port of the memory 310, which accesses an element in the memory 310 selected by the generated next address. The AGU 502 may generate next addresses that walk through the elements of the circular buffer 314. When walking through the elements of the circular buffer 314, the AGU 502 may circle from an end of the buffer, or from an address beyond the buffer memory range, to an address within the valid buffer memory range, by generating a next address equal to an address within the valid memory range of the buffer when the current address, plus the offset, exceeds the ending address.

Figure 6:
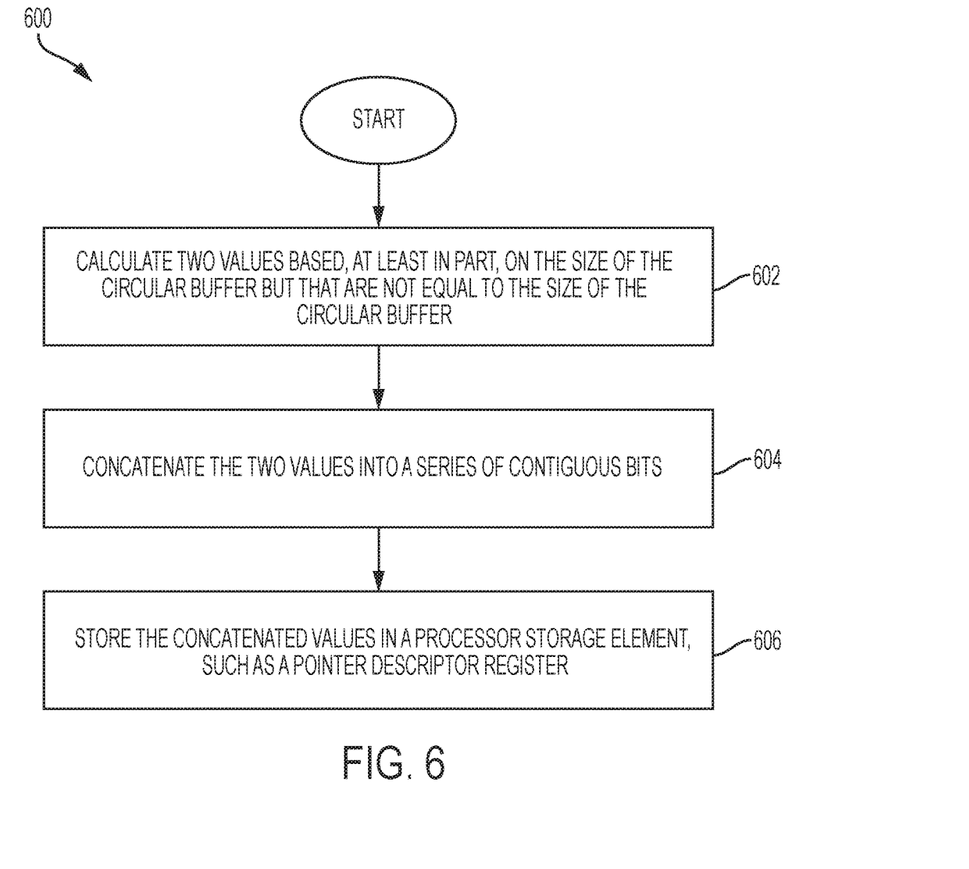
FIG. 6 is an example flow chart illustrating a method of generating a value for storage in a pointer descriptor register according to one embodiment of the disclosure.

The pointer descriptor 302 may be generated by the processor 300 by performing calculations and storing the results in the processor storage element. The pointer descriptor 302 may be generated and stored, for example, at the beginning of an execution of an application that accesses a circular buffer 312. The pointer descriptor 302 may also be generated and stored, for example, at a startup of the processor 300. One method for populating the pointer descriptor 302 is shown in FIG. 6. FIG. 6 is an example flow chart illustrating a method of generating a value for storage in a pointer descriptor register according to one embodiment of the disclosure. A method 600 may begin at block 602 with calculating two values based, at least in part, on the size of the circular buffer but that are not equal to the size of the circular buffer, wherein the two values define a valid set of memory locations for the circular buffer, and wherein the valid set comprises a multiple number of valid memory ranges and wherein the valid memory ranges have starting memory locations and end memory locations. Then, at block 604, the two values may be concatenated into contiguous bits. Next, at block 606, the concatenated values may be stored in a processor storage element, such as a register in the processor 300.

Figure 7:
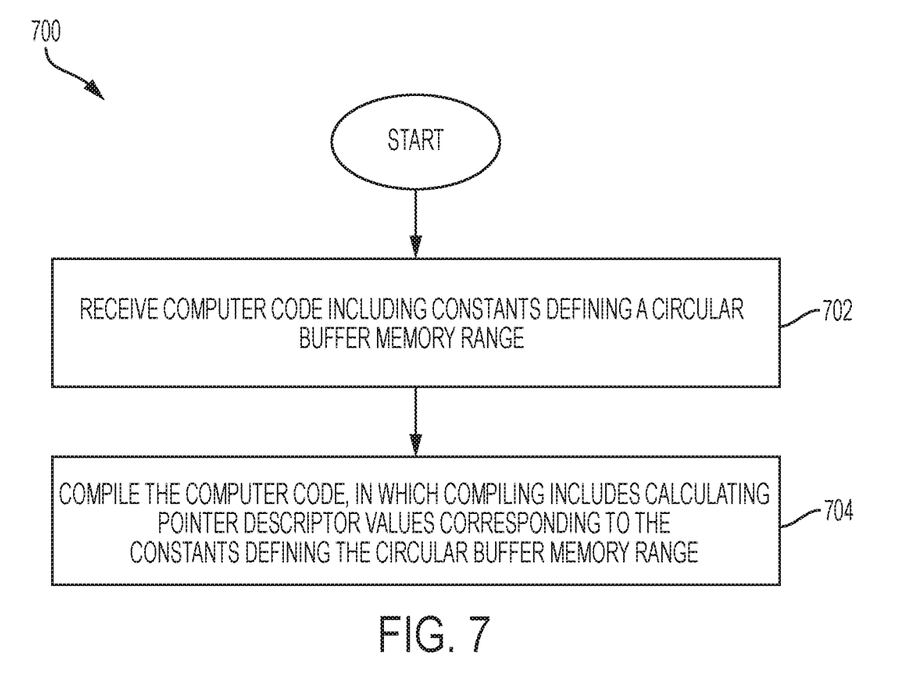
FIG. 7 is an example flow chart illustrating a method for calculating values for a pointer descriptor register during software compilation according to one embodiment of the disclosure.

In some embodiments, the pointer descriptor 302 may be determined by a software development tool. For example, the processor 300 may have an accompanying software development tool that includes a compiler that generates applications for execution on the processor 300 based on application code provided by a developer. The compiler may receive constant values expressed in written application code and convert the constant values to the two values for each circular buffer instantiated by the application when executing on the processor 300. One method for generating a pointer descriptor with a software development tool is shown in FIG. 7. FIG. 7 is an example flow chart illustrating a method for calculating values for a pointer descriptor register during software compilation according to one embodiment of the disclosure. A method 700 may begin at block 702 with the compiler receiving computer code including constants defining, in part, a circular buffer memory range. Then, at block 704, the compiler may compile the computer code, during which one or more values for a pointer descriptor may be calculated.

The use of a pointer descriptor for describing a circular buffer as described in embodiments herein may reduce power consumption of the processor 300. The reduced power may be obtained by reducing repetitive calculations being performed the processor 300. Although an additional storage element may be used in the processor 300 for storing the pointer descriptor, the resulting increases in size and cost of the processor 300 may be insignificant. The advantages of reducing power consumption may outweigh the implementation of additional or usage of existing processor storage element. The power savings may be particularly advantageous for processors in mobile devices where energy is restricted to an attached battery. Further, reductions in size of the processor 300 may be obtained through the use of the pointer descriptor due to reduced complexity of an address generation unit in the processor 300. The power reduction may be a 1-5% reduction of total power consumed by the processor 300, although power reduction numbers may vary based on workload performed by the processor 300. Further, the processor 300 may increase in speed by reducing repetitive calculations. The time consumed to perform certain sets of instructions may be reduced by 2-6%.

The schematic flow chart diagram of FIG. 6 and FIG. 7 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although digital signal processors (DSPs) are described throughout the detailed description, aspects of the invention may be applied to the design of other processors, such as graphics processing units (GPUs) and central processing units (CPUs). Further, although ones (1s) and zeros (0s) are given as example bit values throughout the description, the function of ones and zeros may be reversed without change in operation of the processor described in embodiments above. For example, a one value in a configuration register may be used to indicate either a first mode of operation or a second mode of operation without change in the operation of the processor. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for describing a circular buffer, comprising:
   calculating two values based, at least in part, on the size of the circular buffer but that are not equal to the size of the circular buffer,
      wherein the two values define a valid set of memory locations for the circular buffer,
      wherein the valid set comprises a multiple number of valid memory ranges and wherein the valid memory ranges have starting memory locations and end memory locations, and
      wherein calculating at least one of the two values comprises calculating a value equal to ceiling(log 2(size));
   concatenating the two values into contiguous bits; and
   storing the concatenated values in a processor storage element.

2. The method of claim 1, wherein the step of calculating the value equal to ceiling(log 2(size)) comprises calculating a value that is used to derive the starting memory locations respectively for the valid memory ranges.

3. The method of claim 2, wherein calculating at least one of the two values comprises calculating a value equal to (size−1).

4. The method of claim 2, wherein the step of calculating the two values comprises calculating a second value of the two values that is used in conjunction with the first value to calculate the end memory locations respectively for the valid memory ranges.

5. The method of claim 1, wherein the step of storing the concatenated values in a processor storage element comprises storing the concatenated values in a single register, and wherein the single register may be used in conjunction with a pointer to describe the circular buffer.

6. The method of claim 5, further comprising:
recalling the two values from the single register to compute a next memory address when accessing data stored in the circular buffer; and
using the two values to derive a start memory location and an end memory location for each of the valid memory ranges.

7. The method of claim 6, wherein the step of recalling the two values is performed during modulo arithmetic to compute the next memory address.

8. The method of claim 1, wherein the step of calculating two values comprises calculating the two values in one processor cycle using a single instruction with a single input to the instruction, wherein the single input consists of the size of the circular buffer.

9. The method of claim 1, wherein in the step of calculating two values comprises:
calculating the two values from known constant values at compile time of processor software; and
storing the constant value in an executable memory image from the compiler of the processor.

10. A circular buffer descriptor, comprising:
a contiguous set of bits comprising two values,
wherein the two values are based, at least in part, on a size of a circular buffer and are not equal to the size of the circular buffer,
wherein the two values define a valid set of memory locations for the circular buffer,
wherein the valid set comprises a multiple number of valid memory ranges,
wherein the valid memory ranges have starting memory locations and end memory locations, and
wherein one of the two values comprises a value equal to ceiling(log 2(size)).

11. The circular buffer descriptor of claim 10, wherein a first value equal to ceiling(log 2(size)) of the two values is used to derive the starting memory locations for the valid memory ranges.

12. The circular buffer descriptor of claim 11, wherein a second value of the two values is used in conjunction with the first value to calculate the end memory locations for the valid memory ranges.

13. The circular buffer descriptor of claim 12, wherein one of the two values comprises a value equal to (size−1).

14. The circular buffer descriptor of claim 10, wherein a first value and a second value of the two values are used to compute a next memory address when accessing data stored in the circular buffer and used to derive a start memory location and an end memory location for each of the valid memory ranges.

15. The circular buffer descriptor of claim 14, wherein the first value and the second value of the two values are used in modulo arithmetic to compute the next memory address.

16. The circular buffer descriptor of claim 10, wherein one value of the two values occupies 5 bits, and wherein one value of the two values occupies 19 bits.

17. An apparatus, comprising:
a processor;
a processor storage element coupled to the processor, wherein the processor is configured to perform steps comprising:
calculating two values based, at least in part, on the size of the circular buffer but that are not equal to the size of the circular buffer,
wherein the two values define a valid set of memory locations for the circular buffer wherein the valid set comprises a multiple number of valid memory ranges,
wherein the valid memory ranges have starting memory locations and end memory locations, and
wherein calculating at least one of the two values comprises calculating a value equal to ceiling(log 2(size));
concatenating the two values into contiguous bits; and
storing the concatenated values in the processor storage element.

18. The apparatus of claim 17, wherein the step of calculating the value equal to ceiling(log 2(size)) comprises calculating a value that is used to derive the starting memory locations respectively for the valid memory ranges.

19. The apparatus of claim 18, wherein calculating at least one of the two values comprises calculating a value equal to (size−1).

20. The apparatus of claim 18, wherein the step of calculating the two values comprises calculating a second value of the two values that is used in conjunction with the first value to calculate the end memory locations respectively for the valid memory ranges.

21. The apparatus of claim 17, wherein the processor storage element comprises a single register, wherein the step of storing the concatenated values in a processor storage element comprises storing the concatenated values in the single register, and wherein the apparatus further comprises a memory coupled to the processor and configured to store the circular buffer, and wherein the single register may be used in conjunction with a pointer to describe the circular buffer.

22. The apparatus of claim 21, wherein the processor is further configured to perform steps comprising recalling the two values from the single register to compute a next memory address when accessing data stored in the circular buffer; and using the two values to derive a start memory location and an end memory location for each of the valid memory ranges.

23. The apparatus of claim 22, wherein the processor is configured to perform the step of recalling the two values from the single register when performing modulo arithmetic to compute the next memory address.

24. A computer program product, comprising:
a non-transitory computer readable medium comprising code to perform steps comprising:
calculating two values based, at least in part, on the size of the circular buffer but that are not equal to the size of the circular buffer,
wherein the two values define a valid set of memory locations for the circular buffer,
wherein the valid set comprises a multiple number of valid memory ranges and wherein the valid memory ranges have starting memory locations and end memory locations, and
wherein calculating at least one of the two values comprises calculating a value equal to ceiling(log 2(size)); and
concatenating the two values into contiguous bits.

25. The computer program product of claim 24, wherein the step of calculating the value equal to ceiling(log 2(size)) comprises calculating a value that is used to derive the starting memory locations respectively for the valid memory ranges.

26. The computer program product of claim 25, wherein calculating at least one of the two values comprises calculating a value equal to (size−1).

27. The computer program product of claim 25, wherein the step of calculating the two values comprises calculating a second value of the two values that is used in conjunction with the first value to calculate the end memory locations respectively for the valid memory ranges.

28. The computer program product of claim 24, wherein the step of storing the concatenated values in a processor storage element comprises storing the concatenated values in a single register, and wherein the single register may be used in conjunction with a pointer to describe the circular buffer.

29. The computer program product of claim 28, wherein the medium further comprises code to perform steps comprising:
recalling the two values from the single register to compute a next memory address when accessing data stored in the circular buffer; and
using the two values to derive a start memory location and an end memory location for each of the valid memory ranges.

30. The computer program product of claim 29, wherein the step of recalling the two values comprises recalling the two values from the single register when performing modulo arithmetic to compute the next memory address.

31. The computer program product of claim 24, wherein the step of calculating two values comprises calculating the two values in one processor cycle using a single instruction with a single input to the instruction, wherein the single input consists of the size of the circular buffer.

\* \* \* \* \*